(12) United States Patent
Kang et al.

(10) Patent No.: US 9,376,502 B2
(45) Date of Patent: *Jun. 28, 2016

(54) ACETYLATED CELLULOSE ETHER AND ARTICLES INCLUDING SAME

(75) Inventors: Gyung Don Kang, Daejeon (KR); Jin Kyu Kang, Daejeon (KR); Hyun Young Park, Bucheon-si (KR); Min Ju Song, Busan (KR)

(73) Assignee: LOTTE FINE CHEMICAL CO., LTD. (KR)

( * ) Notice: Subject to any disclaimer, the term of this patent is extended or adjusted under 35 U.S.C. 154(b) by 58 days.

This patent is subject to a terminal disclaimer.

(21) Appl. No.: 13/885,091

(22) PCT Filed: Mar. 9, 2011

(86) PCT No.: PCT/KR2011/001622
§ 371 (c)(1),
(2), (4) Date: May 13, 2013

(87) PCT Pub. No.: WO2012/077860
PCT Pub. Date: Jun. 14, 2012

(65) Prior Publication Data
US 2013/0245248 A1     Sep. 19, 2013

(30) Foreign Application Priority Data

Dec. 6, 2010 (KR) .................. 10-2010-0123480

(51) Int. Cl.
| | | |
|---|---|---|
| *C08F 251/02* | (2006.01) | |
| *B01D 61/36* | (2006.01) | |
| *C08B 13/00* | (2006.01) | |
| *B01D 71/22* | (2006.01) | |
| *C08B 11/08* | (2006.01) | |
| *C08B 11/12* | (2006.01) | |

(52) U.S. Cl.
CPC ............... *C08B 13/00* (2013.01); *B01D 71/22* (2013.01); *C08B 11/08* (2013.01); *C08B 11/12* (2013.01)

(58) Field of Classification Search
CPC ........................... C08F 251/02; B01D 61/364
USPC ........................................................... 536/66
See application file for complete search history.

(56) References Cited

U.S. PATENT DOCUMENTS

| | | | |
|---|---|---|---|
| 2,593,540 A | | 4/1952 | Cornwell et al. |
| 3,592,672 A | | 7/1971 | Rowley et al. |
| 3,940,384 A | * | 2/1976 | Teng .............. C08B 13/00 106/168.01 |
| 4,305,823 A | | 12/1981 | Batzer et al. |
| 4,519,801 A | | 5/1985 | Edgren |
| 5,700,929 A | * | 12/1997 | Kokubo ............. C09D 101/32 424/464 |
| 2003/0065165 A1 | * | 4/2003 | Dannhorn ........... C08B 11/193 536/91 |

FOREIGN PATENT DOCUMENTS

| | | | |
|---|---|---|---|
| JP | 63260956 A | * | 10/1988 |
| JP | 2009114397 A | | 5/2009 |
| JP | 2009295107 A | | 12/2009 |

OTHER PUBLICATIONS

International Search Report-PCT/KR2011/001622 dated Nov. 23, 2011.
Written Opinion-PCT/KR2011/001622 dated Nov. 23, 2011.
Japanese Office Action with English Translation for JP 2013-541880 dated Dec. 4, 2014.
Tesuka, et al., Determination of Substituent Distribution in Cellulose Ethers by Mean of a 18C NMR Study on Their Acetylated Derivatives. 1. Methylcellulose, Macromolecules, vol. 20, No. 10, 1987, pp. 2413-2418.

* cited by examiner

*Primary Examiner* — Fereydoun G Sajjadi
*Assistant Examiner* — Everett White
(74) *Attorney, Agent, or Firm* — Cantor Colburn LLP

(57) ABSTRACT

Provided are acetylated cellulose ether and an article including the same. The acetylated cellulose ether has a molecular weight of about 1,000 to about 1,000,000 Daltons, a contact angle of about 20 to about 45 degrees (°), and a tensile strength of about 50 to about 100 MPa.

4 Claims, No Drawings

ACETYLATED CELLULOSE ETHER AND ARTICLES INCLUDING SAME

TECHNICAL FIELD

The present disclosure relates to acetylated cellulose ether and an article including the same, and more particularly, to acetylated cellulose ether having a molecular weight of about 1,000 to about 1,000,000 Daltons, a contact angle of about 20 to about 45 degrees(°), and a tensile strength of about 50 to about 100 MPa.

BACKGROUND ART

A material for a membrane for water treatment should have a high hydrophilicity, chlorine resistance, and tensile strength. More specifically, as the hydrophilicity increases the membrane is less likely to be contaminated; as the chlorine resistance increases a contaminated membrane can be washed without being damaged; and as the tensile strength increases the membrane can better tolerate a pressure during a long term use.

Conventionally, cellulose acetate, which has low tensile strength and chlorine resistance but high hydrophilicity, thus reducing membrane contamination and extending a membrane washing cycle, and polyvinylidene difluoride (PVDF), which has low hydrophilicity but high chlorine resistance, thus being suitable for washing, have been mainly used as materials for a membrane for water treatment.

Cellulose acetate as a membrane material for water treatment is advantageous in that it can minimize membrane contamination due to its high hydrophilicity but it has a disadvantage of having a low mechanical strength. That is, when cellulose acetate is prepared a polar catalyst such as inorganic acid must be used because the synthesis of cellulose acetate requires acetylation, which destroys the crystalline structure of cellulose used as a raw material. As a result, the cellulose backbone is easily broken and the finally produced cellulose acetate has a low molecular weight and an extremely low mechanical strength.

In contrast, polyvinylidene difluoride, which has excellent mechanical strength and chlorine resistance but low hydrophilicity, is disadvantageous in that a membrane prepared using the same is easily contaminated thus requiring frequent washing.

DISCLOSURE

Technical Problem

According to an aspect of the present disclosure, there is provided acetylated cellulose ether having a molecular weight of about 1,000 to about 1,000,000 Daltons, a contact angle of about 20 to about 45 degrees(°), and a tensile strength of about 50 to about 100 MPa.

According to another aspect of the present disclosure, there is provided an article including the acetylated cellulose ether.

Technical Solution

In an embodiment, the present disclosure provides acetylated cellulose ether having a molecular weight of about 1,000 to about 1,000,000 Daltons, a contact angle of about 20 to about 45 degrees(°), and a tensile strength of about 50 to about 100 MPa.

The acetylated cellulose ether has a degree of substitution (DS) of an alkyl group of 1 to 2, a molar substitution (MS) of a hydroxyalkyl group of 0 to 1, and a DS of an acetyl group of 1 to 2.

The acetylated cellulose ether may be formed by acetylation of at least one cellulose ether selected from the group consisting of methyl cellulose, hydroxypropyl methyl cellulose, and hydroxy ethyl methylcellulose.

According to another aspect of the present disclosure, there is provided an article including the acetylated cellulose ether.

The article may be a membrane for water treatment.

Advantageous Effects

The acetylated cellulose ether according to an embodiment of the present disclosure is advantageous in that it has a high molecular weight unlike cellulose acetate (e.g., cellulose triacetate) because the degree of polymerization (DP) of cellulose as a raw material is hardly reduced during manufacture. In addition, the acetylated cellulose ether is insoluble in water but readily soluble in an organic solvent. It is superior in terms of hydrophilicity to cellulose acetate, and has greater mechanical strength than polyvinylidene difluoride and thus it may be used as a material to replace the material for conventional membrane for water treatment.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

Mode for Invention

Hereinafter, acetylated cellulose ether and an article including the acetylated cellulose ether, according to embodiments of the present disclosure, will be described in more detail.

The acetylated cellulose ether according to an embodiment of the present disclosure has a molecular weight of about 1,000 to about 1,000,000 Daltons, a contact angle of about 20 to about 45 degrees(°), and a tensile strength of about 50 to about 100 MPa.

In the present disclosure, 'contact angle' refers to an angle established between a free surface of water and a plane of a film when the film prepared using the acetylated cellulose ether is in contact with water. In addition, 'tensile strength' refers to the tensile strength of a film prepared using the acetylated cellulose ether.

The acetylated cellulose ether has a degree of substitution (DS) of an alkyl group of 1 to 2, a molar substitution (MS) of a hydroxyalkyl group of 0 to 1, and a DS of an acetyl group of 1 to 2.

The acetylated cellulose ether may be formed by acetylation of cellulose ether having a DS of an alkyl group of 1 to 2, and an MS of a hydroxyalkyl group of 0 to 1. Here, the alkyl group may have 1 to 16 carbon atoms. In manufacturing the acetylated cellulose ether, cellulose or cellulose ether having the above degree of substitutions (DS, MS) may be used as a starting material.

The acetylated cellulose ether may have a DS of an acetyl group of 1 to 2.

When the cellulose ether having the above DS of an alkyl group and the above MS of a hydroxyalkyl group is acetylated, acetylated cellulose ether, which is insoluble in water but easily soluble in an organic solvent such as acetone and has high mechanical strength due to high molecular weight, can be obtained, as explained later in detail.

The acetylated cellulose ether may be prepared by acetylating at least one cellulose ether selected from the group consisting of methylcellulose, hydroxypropyl methylcellulose, and hydroxy ethyl methylcellulose.

In addition, a viscosity of a solution prepared by dissolving the acetylated cellulose ether in acetone to a concentration of the acetylated cellulose ether of 2 wt % may be in the range of about 5 to about 100,000 cps (centipoise) when measured at 20° C. and at 20 rpm using a Brookfield viscometer. If the viscosity of the solution is within the range described above, the acetylated cellulose ether has excellent mechanical strength.

The acetylated cellulose ether may have a melting point of about 180 to about 250° C. If the melting point is within the above range the acetylated cellulose ether may be used in melt processing such as an injection.

Hereinafter, a method of preparing acetylated cellulose ether, according to an embodiment of the present disclosure, will be described in detail.

First, cellulose ether is prepared by etherifying a hydroxyl group of cellulose. That is, cellulose ether is formed by etherification of cellulose by blocking some part of hydroxyl groups in the cellulose structure or by substituting hydrogen in the hydroxyl groups with other substituents. Here, although the cellulose backbone is not broken but maintained, the hydrogen bond within the cellulose is destroyed thereby converting the cellulose into a non-crystalline structure and obtaining a water-soluble cellulose ether with high molecular weight.

Then, a hydrogen atom in a hydroxyl group contained in thus prepared wayer-soluble cellulose ether is substituted with an acetyl group ($CH_3CO^-$) (acetylation) to prepare water-insoluble acetylated cellulose ether. Formulae 1 and 2 show processes of converting anhydroglucose, as a basic repeating unit of cellulose, into a basic repeating unit of acetylated cellulose ether by etherification and subsequent acetylation of the anhydroglucose.

[Formula 1]

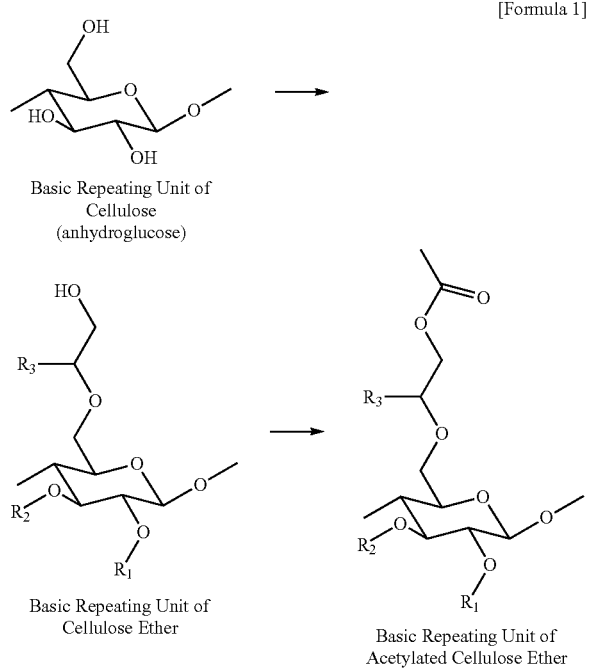

Basic Repeating Unit of Cellulose (anhydroglucose)

Basic Repeating Unit of Cellulose Ether

Basic Repeating Unit of Acetylated Cellulose Ether

[Formula 2]

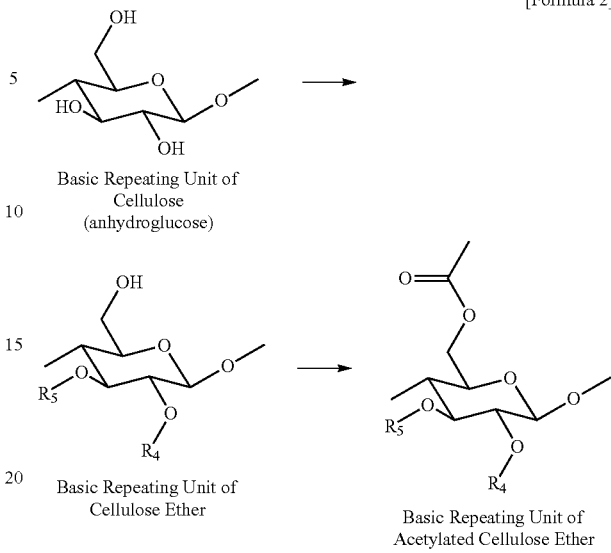

Basic Repeating Unit of Cellulose (anhydroglucose)

Basic Repeating Unit of Cellulose Ether

Basic Repeating Unit of Acetylated Cellulose Ether

In Formula 1, the cellulose is converted into hydroxyalkylalkylcellulose by etherification, and then the hydroxyalkylalkylcellulose is converted into acetylated cellulose ether by acetylation. In Formula 2, the cellulose is converted into alkyl cellulose by etherification, and then the alkyl cellulose is converted into acetylated cellulose ether by acetylation.

In Formula 1, $R_1$ and $R_2$ may be each independently H, $CH_3$, $CH_2CH_2OH$, or $CH_2CH(CH_3)OH$, and $R_3$ may be H or $CH_3$.

In Formula 2, $R_4$ and $R_5$ are each independently H or $CH_3$, and at least one of $R_4$ and $R_5$ is $CH_3$.

The acronym "DS" used herein indicates the average number of hydroxyl groups substituted with alkyl group(s) or acetyl group(s) per anhydroglucose unit. Since one anhydroglucose unit may include up to three hydroxyl groups, a theoretical maximum DS of an alkyl group or an acetyl group is 3 when the hydroxyl groups are substituted with a monofunctional substituent. However, a multi-functional or polymerizable substituent may react with hydrogen in the hydroxyl group contained in the anhydroglucose unit, and also react with itself, so that a DS thereof is not limited to 3. In addition, the acronym "MS" used herein indicates the number of moles of multi-functional or polymerizable substituent per anhydroglucose unit. There is no theoretical maximum value of the MS of multi-functional or polymerizable substituent.

In an exemplary embodiment of the present disclosure, the acetylated cellulose ether may be prepared by substituting hydrogen in most of the hydroxyl groups present in cellulose ether with hydrophobic acetyl groups. Thus, the acetylated cellulose ether is not soluble in water, but is soluble in an organic solvent.

An article according to another embodiment of the present disclosure includes the acetylated cellulose ether. Examples of the article include a membrane for water treatment.

Hereinafter, one or more embodiments will be described in detail with reference to the following examples. However, these examples are not intended to limit the purpose and scope of the invention.

EXAMPLE

Examples 1~9

Preparation of Acetylated Cellulose Ether 200 g of cellulose ether, 1400 g of acetic acid, 300 g of sodium acetate, 600 g of acetic anhydride were added to a 3 L reactor equipped with a stirrer, and the mixture was heat-treated at 85° C. for 8 hours while stirring at 200 rpm to prepare acetylated cellulose ether. Here, acetic acid was used as a solvent, and sodium acetate was used as a catalyst. Then, the mixture in the reactor was coagulated by spraying it into an 18 L coagulating bath, washed 5 times with clean water, and dried. The DS of a methyl group, the MS of a hydroxyalkyl group, and the MS of a hydroxyethyl group of each of the cellulose ethers that were used in Examples 1 to 9, and the molar ratio of acetic anhydride used per anhydroglucose unit contained in each of the cellulose ethers are listed in Table 1 below.

TABLE 1

| | cellulose ether | | | | acetic |
|---|---|---|---|---|---|
| | Type | DS of methyl group | MS of hydroxy-propyl group | MS of hydroxy-ethyl group | anhydride/anhydro-glucose unit (mole ratio) |
| Example 1 | PMA15M | 1.84 | 0.25 | — | 5.95 |
| Example 2 | PMB40H | 1.83 | 0.19 | — | 5.84 |
| Example 3 | PMT19U | 1.63 | 0.08 | — | 5.57 |
| Example 4 | PMC50U | 1.40 | 0.21 | — | 5.70 |
| Example 5 | PMH9860 | 1.20 | 0.83 | — | 6.68 |
| Example 6 | MC40H | 1.90 | — | — | 5.55 |
| Example 7 | EMA70U | 1.45 | — | 0.29 | 5.87 |
| Example 8 | EMB80H | 1.47 | — | 0.22 | 5.75 |
| Example 9 | EMC50U | 1.86 | — | 0.33 | 6.09 |

\* In Table 1, each of the cellulose ethers used in Examples 1 to 9 was commercially manufactured by Samsung Fine Chemicals Co., Ltd.

Comparative Example 1

Preparation of Cellulose Triacetate (CTA)

CTA (Eastman A435-85) was prepared.

Comparative Example 2

Preparation of Polyvinylidene Difluoride (PVDF)

PVDF (Kynar flex 761) was prepared.

Evaluation Example

Evaluation of Physical Properties of Acetylated Cellulose Ether

The DS of an acetyl group, contact angle with water, and tensile strength and/or molecular weight of each of the acetylated cellulose ethers prepared according to Examples 1 to 9, CTA of Comparative Example 1 and PVDF of Comparative Example 2 were measured using the methods below, and the results are listed in Table 2.

(Measurement of DS of an Acetyl Group)

Free acetic acids generated by saponification of acetylated cellulose ether samples prepared according to Examples 1 to 9, and CTA of Comparative Example 1were titrated with an alkaline material to measure the DS of an acetyl group of each of the acetylated cellulose ethers (ASTM D871-96).

(Measurement of Contact Angle and Tensile Strength)

10 g of each sample of Examples 1 to 9 and Comparative Examples 1 to 2 were dissolved in 90 g of dimethylformamide (DMF). 10 g of each of thus prepared solution was collected, casted on a glass plate with a thickness of 2 mm, and dried under vacuum oven kept at 60° C. to finally obtain a film with a thickness of 0.2±0.02 mm.

(1) Measurement of Contact Angle

Contact angle of each of the above prepared films with respect to water was measured by using a contact angle measurement apparatus (KSV, Theta optical tensiometer) while the each of the films was in contact with water. Here, the smaller the contact angle the greater the hydrophilicity.

(2) Measurement of Tensile Strength

Tensile strength of each of the above prepared films was measured by using a tensile strength measurement apparatus (Instron, No. 5569).

(Measurement of Molecular Weight)

Weight average molecular weight (Mw) of each of the above prepared films was measured by using size exclusion chromatography (Agilent, HP 1100). More specifically, 0.1 g of each of the samples was dissolved in 100 g of DMF (HPLC grade), and Mw thereof was measured at 25° C. and under a flow rate of 10 ml/min using DMF as a mobile phase.

TABLE 2

| | DS of acetyl group | Contact Angle (°) | Tensile Strength (MPa) | MW (Daltons) |
|---|---|---|---|---|
| Example 1 | 1.15 | 38 | 55 | 280,000 |
| Example 2 | 1.15 | 36 | 61 | 370,000 |
| Example 3 | 1.35 | 34 | 77 | 540,000 |
| Example 4 | 1.57 | 34 | 89 | 780,000 |
| Example 5 | 1.78 | 31 | 83 | 650,000 |
| Example 6 | 1.06 | 42 | 60 | 350,000 |
| Example 7 | 1.52 | 33 | 96 | 840,000 |
| Example 8 | 1.50 | 35 | 64 | 420,000 |
| Example 9 | 1.13 | 28 | 85 | 770,000 |
| Comparative Example 1 | 2.88 | 45 | 38 | 50,000 |
| Comparative Example 2 | — | 78 | 52 | 510,000 |

Referring to Table 2, each of the acetylated cellulose ether prepared according to Examples 1 to 9 has a DS of an acetyl group of 1 to 2, whereas the CTA of Comparative Example 1 has a DS of an acetyl group that is greater than 2. In addition, each of the acetylated cellulose ethers prepared according to Examples 1 to 9 has a smaller contact angle, a higher hydrophilicity due to a smaller contact angle, superior tensile strength, and higher molecular weight than the CTA of Comparative Example 1. Furthermore, each of the acetylated cellulose ethers prepared according to Examples 1 to 9 has a smaller contact angle, a higher hydrophilicity due to a smaller contact angle and superior tensile strength than the PVDF of Comparative Example 2.

The invention claimed is:

1. Acetylated cellulose ether having a molecular weight of about 1,000 to about 1,000,000 Daltons, a contact angle of about 20 to about 38 degrees(°), and a tensile strength of about 50 to about 100 MPa, wherein the acetylated cellulose ether has a degree of substitution (DS) of an alkyl group of 1 or 2, a molar substitution (MS) of a hydroxyalkyl group of 0.08 to 1, and a DS of an acetyl group of 1 or 2.

2. The acetylated cellulose ether according to claim 1, wherein the acetylated cellulose ether is formed by acetylation of at least one cellulose ether selected from the group consisting of methyl cellulose, hydroxypropyl methyl cellulose, and hydroxy ethyl methylcellulose.

3. An article including the acetylated cellulose ether according to claim 1.

4. The article according to claim 3, wherein the article is a membrane for water treatment.

\* \* \* \* \*